United States Patent
Xiang

(10) Patent No.: US 10,123,565 B2
(45) Date of Patent: Nov. 13, 2018

(54) INFORMATION INTERACTION METHOD AND INFORMATION INTERACTION SYSTEM

(71) Applicant: SHENZHEN KIMSEN TECHNOLOGY CO., LTD, Shenzhen, Guangdong (CN)

(72) Inventor: Zhiyong Xiang, Guangdong (CN)

(73) Assignee: SHENZHEN KIMSEN TECHNOLOGY CO., LTD, Shenzhen (CN)

( * ) Notice: Subject to any disclaimer, the term of this patent is extended or adjusted under 35 U.S.C. 154(b) by 23 days.

(21) Appl. No.: 15/301,405

(22) PCT Filed: Apr. 3, 2014

(86) PCT No.: PCT/CN2014/074755
§ 371 (c)(1),
(2) Date: Oct. 3, 2016

(87) PCT Pub. No.: WO2015/149336
PCT Pub. Date: Oct. 8, 2015

(65) Prior Publication Data
US 2017/0027231 A1    Feb. 2, 2017

(51) Int. Cl.
*A24F 47/00* (2006.01)
*G06K 7/10* (2006.01)
*H04W 4/80* (2018.01)

(52) U.S. Cl.
CPC ........ *A24F 47/008* (2013.01); *G06K 7/10366* (2013.01); *H04W 4/80* (2018.02)

(58) Field of Classification Search
CPC .. A24F 47/008; G06K 7/10366; H04W 4/008
See application file for complete search history.

(56) References Cited

U.S. PATENT DOCUMENTS

| 9,820,509 | B2 * | 11/2017 | Newton | ............... | H05B 1/0244 |
| 2013/0340775 | A1 * | 12/2013 | Juster | ................... | H04L 67/42 |
| | | | | | 131/273 |
| 2015/0181945 | A1 * | 7/2015 | Tremblay | .............. | A24F 47/008 |
| | | | | | 131/328 |

FOREIGN PATENT DOCUMENTS

| CN | 203446536 U | 2/2014 |
| CN | 103653261 A | 3/2014 |

OTHER PUBLICATIONS

International Search Report of PCT Patent Application No. PCT/CN2014/074755 dated Jan. 6, 2015.

* cited by examiner

*Primary Examiner* — James Yang

(57) ABSTRACT

Disclosed are an information interaction method and an information interaction system, using at least two electronic cigarettes for information interaction. The method comprises the following steps: S1. at least one electronic cigarette in a preset distance sends taste information carrying a tobacco tar taste type and a taste comment to one or more other electronic cigarettes in the area; and S2. An electronic cigarette receiving the taste information saves, generates a prompt of, and/or forwards the taste information. By using the method of the present invention, tobacco tar taste information is shared, favorite tastes can be recommended between each other and disfavor tastes can also be provided for others as reference information.

1 Claim, 8 Drawing Sheets

INFORMATION INTERACTION METHOD AND INFORMATION INTERACTION SYSTEM

TECHNICAL FIELD

The present application relates to the field of daily electrical products, and more particularly relates to an information interaction method and an information interaction system.

BACKGROUND

An electronic cigarette generally comprises a battery pole and an atomizer. Each atomizer has at least one taste type of liquid smoke flavor. In the prior art, the electronic cigarettes can not interact information with each other; a user can not evaluate the taste of the liquid smokein the atomizer; a user can not communicate the taste comment of the atomizer with other users and obtain the taste recommended by other users.

Furthermore, in the prior art, the battery pole can not obtain the taste type of the replaced disposable atomizer; the taste of the tobacco tar can not be automatically identified; when the user prefers to one taste type, he can not know the name of the taste type and cannot recommend it to other smokers.

Therefore, the prior art has defects and needs to be improved.

BRIEF SUMMARY

The objective of the present application is to provide an information interaction method and an information interaction system aiming at defect in the prior art that electronic cigarettes can not interact taste types and taste comments of electronic cigarettes with each other.

The technical solutions of the present application for solving the technical problems are as follows: an information interaction method applied for electronic cigarette is conducted, wherein, at least two electronic cigarettes are used for information interaction, and the method comprises following steps:

S1, at least one electronic cigarette in a preset distance sends taste information carrying a tobacco tar taste type and a taste comment to one or more other electronic cigarettes in the preset distance;

S2, an electronic cigarette receiving the taste information saves, generates a prompt of, and/or forwards the taste information.

The information interaction method in the present application, wherein, a RFID electronic tag for identifying the tobacco tar taste type is set on each of the electronic cigarettes, and before the step S1 a step S0 for obtaining the tobacco tar taste type is comprised:

S0, reading the corresponding RFID electronic tag, and obtaining the tobacco tar taste type of the electronic cigarette.

The information interaction method in the present application, wherein, the step S1 further comprises: the electronic cigarette sending the taste information generates a prompt of a current tobacco tar taste type.

The information interaction method in the present application, wherein, the method further comprises: the electronic cigarette sending the taste information is triggered to generate a first trigger signal to generate the prompt of the current tobacco tar taste type.

The information interaction method in the present application, wherein, the electronic cigarette comprises at least a first switch, and before the step S1, the method further comprises:

S01, a user triggers a corresponding first switch to send a taste comment evaluating the tobacco tar taste type.

The information interaction method in the present application, wherein, the electronic cigarette comprises a control module, a first information table including a variety of tobacco tar taste types and comments of the user is saved in the control module;

after the step S01, the method further comprises:

S02, keeping the taste comment and the corresponding tobacco tar taste type obtaining in the step S0 in the first information table;

the method further comprises: generating a prompt of the tobacco tar taste type and the corresponding taste comment in the first information table to the user.

The information interaction method in the present application, wherein, if the first information table has already kept the tobacco tar taste type the taste comment obtained in this step S0, a taste comment kept before is replaced by a taste comment of this step S01 when going to the step S02.

The information interaction method in the present application, wherein, the electronic cigarette comprises a control module, a second information table including a variety of tobacco tar taste types and taste comments of other users is saved in the control module;

saving the taste information in the step S2 comprises:

if the tobacco tar taste type included in the received taste information is not existed in the second information table, adding the received tobacco tar taste type and the received taste comment into second information table at the same time;

if the tobacco tar taste type included in the received taste information is already existed in the second information table, adding a taste comment received this time into an exited taste comment corresponding to the tobacco tar taste type;

the method further comprises: generating a prompt to a user of tobacco tar taste types and the corresponding taste comments in the second information table.

The information interaction method in the present application, wherein, the electronic cigarette comprises a control module, an information filtering table is saved in the control module;

the taste information in the step S1 further comprises: an identification number of the electronic cigarette sending a tobacco tar taste information;

the information filtering table comprises: a variety of tobacco tar taste types received from other electronic cigarettes, and identification numbers of electronic cigarettes those have sent taste comments about the received tobacco tar taste types, each of the identification numbers is corresponding to each of the tobacco tar taste types;

the step S2 specifically comprises:

S21, receiving the taste information;

S22, judging if at least one of the tobacco tar taste type and the identification number included in the received taste information is not exited in the information filtering table, if so, going to step S23; if not so, going to step S24;

S23, saving, generating a prompt of, and/or forwarding the taste information;

S24, giving no responses or forwarding the taste information.

The information interaction method in the present application, wherein, generating a prompt of the taste information in the step S2 comprises: text displaying or/and voice broadcasting or/and LED displaying.

The information interaction method in the present application, wherein, the method further comprises: the electronic cigarette sending the taste information sends the taste information after being triggered to generate a second trigger signal;

or/and the method further comprises: the electronic cigarette receiving the taste information receives the taste information after being triggered to generate a third trigger signal.

The information interaction method in the present application, wherein, the method further comprises:

S1', at least one electronic cigarette in a preset distance sends request information carrying anelectronic cigarette type to one or more other electronic cigarettes in the preset distance;

S2', an electronic cigarette receiving the request information judges if the electronic cigarette type included in the request information is the same as an electronic cigarette type of the electronic cigarette receiving the request information, if so, sends a confirm information to the electronic cigarette sending the request information;

S3', the electronic cigarette sending the request information generates a prompt after obtaining the confirm information sent by at least one electronic cigarette.

An information interaction system is also provided, which comprises at least two electronic cigarettes for information interaction in a preset distance, each of the electronic cigarettes comprises a control module, a wireless communication module, a prompt generation module;

the wireless communication module and the prompt generation module are respectively connected to the control module;

the control module is configured to load a taste information including a tobacco tar taste type and a taste comment to the wireless communication module;

the wireless communication module is configured to send an electromagnetic signal including the taste information to one or more other electronic cigarettes in the preset distance; or to receive an electromagnetic signal which includes a taste information and is sent by one or more other electronic cigarettes in the preset distance,and send the taste information to the control module;

when receiving the taste information sent by other electronic cigarettes in the preset distance, the control module is further configured to save the taste information, or/and toreload the taste information onto the wireless communication module for forwarding, or/and to send the taste information to the prompt generation module to generate a prompt.

The information interaction systemin the present application, wherein, a RFID electronic tag for identifying the tobacco tar taste type is set on the electronic cigarette, the electronic cigarette further comprises a RFID identification module, an air flow sensor and a first switch;

wherein the RFID electronic tag is fixed on an atomizer of the electronic cigarette;

the atomizer, the RFID identification module, the air flow sensor and the first switch are respectively connected to the control module;

the air flow sensor is configured to send airflow induction signal when sensing an air flow;

the control module is further configured to control the atomizer to work and atomize tobacco tar when receiving the airflow induction signal;

the RFID identification module is configured to identify the RFID electronic tag of the atomizer and send an identifying information to the control module;

when triggered by a user the first switch is configured to send information representing a taste comment inputted by the user to the control module;

the control module is further configured to obtain a tobacco tar taste type of the atomizer according to the identifying information, and after receiving a taste comment information, load the taste information including the tobacco tar taste type and the taste comment onto the wireless communication module.

The information interaction systemin the present application, wherein, the control module is further configured to send the tobacco tar taste type to the prompt generation module to generate a prompt of the tobacco tar taste type of the current atomizer after receiving the taste comment information.

The information interaction system in the present application, wherein, the electronic cigarette further comprises a function switch connected to the control module and is configured to start a prompt generation function of the tobacco tar taste type of the current atomizer.

The information interaction systemin the present application, wherein, a first information table including a variety of tobacco tar taste types and comments of the user is saved in the control module;

the control module is further configured to keep the taste comment in the first information table after receiving the taste comment information, and the taste comment is kept according to the tobacco tar taste type obtained by the RFID identification module;

the control module is further configured to send the tobacco tar taste type and the corresponding taste comment in the first information table to the prompt generation module to generate a prompt when the user starts to query historical comment information.

The information interaction system in the present application, wherein, a second information table including a variety of tobacco tar taste types and taste comments of other users is saved in the control module;

the control module is further configured to add the received tobacco tar taste type and the received taste comment into second information table at the same time when the tobacco tar taste type included in the received taste information is not existed in the second information table; add a taste comment received this time into an exited taste comment corresponding to the tobacco tar taste type when the tobacco tar taste type included in the received taste information is already existed in the second information table;

the control module is further configured to, when the user starts to query recommended information from others, send the tobacco tar taste types and the corresponding taste comments in the second information table to the prompt generation module to generate a prompt.

The information interaction systemin the present application, wherein, the control module is further configured to load a request information carrying an electronic cigarette type onto the wireless communication module to send it; the wireless communication module is further configured toreceive request information sent by one or more other electronic cigarettes in the preset distance, and to send the request information to the control module;

the control module is further configured to when receiving the request information sent by other electronic cigarettes, judge if the electronic cigarette type included in the request information is the same as an electronic cigarette type of the electronic cigarette receiving the request information, and if so, send a confirm information to the electronic cigarette sending the request information, the control module is further configured to control the prompt generation module to generate a prompt after obtaining the confirm information sent by at least one electronic cigarette.

The information interaction system in the present application, wherein, the control module comprises a microprocessor with a type of PIC16F877; the RFID identification module comprises a RF chip with a type of TRF796x; the first switch is a key switch; the wireless communication module comprises a wireless transceiver chip with a type of nRF24L01; the prompt generation module comprises a voice microcontroller with a type of HT86A72 and a speaker; the speaker is connected to the voice microcontroller, and the voice microcontroller is connected to the microprocessor.

When implementing the information interaction method and the information interaction system of the present application, the following advantageous effects can be achieved: the present application uses at least two electronic cigarettes in a preset distance to perform an information interaction; an electronic cigarette cannot only send a taste information carrying a tobacco tar taste type and a taste comment to other electronic cigarettes, but also receive a taste information sent from other electronic cigarettes; furthermore, the received taste information can be chosen to be saved or/and prompted or/and forwarded; thus, tobacco tar taste information is shared, favorite tastes can be recommended between each other and disfavor tastes can also be provided for others as reference information.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

The present application uses at least two electronic cigarettes in a preset distance to perform an information interaction; an electronic cigarette can not only send a taste information carrying a tobacco tar taste type and a taste comment to other electronic cigarettes, but also receive a taste information sent from other electronic cigarettes; furthermore, the received taste information can be chosen to be saved or/and prompted or/and forwarded; thus, tobacco tar taste information is shared, favorite tastes can be recommended between each other and disfavor tastes can also be provided for others as reference information.

To make the technical feature, objective and effect of the present application be understood more clearly, now the specific implementation of the present application is described in detail with reference to some of the accompanying drawings and embodiments.

Figure 1:
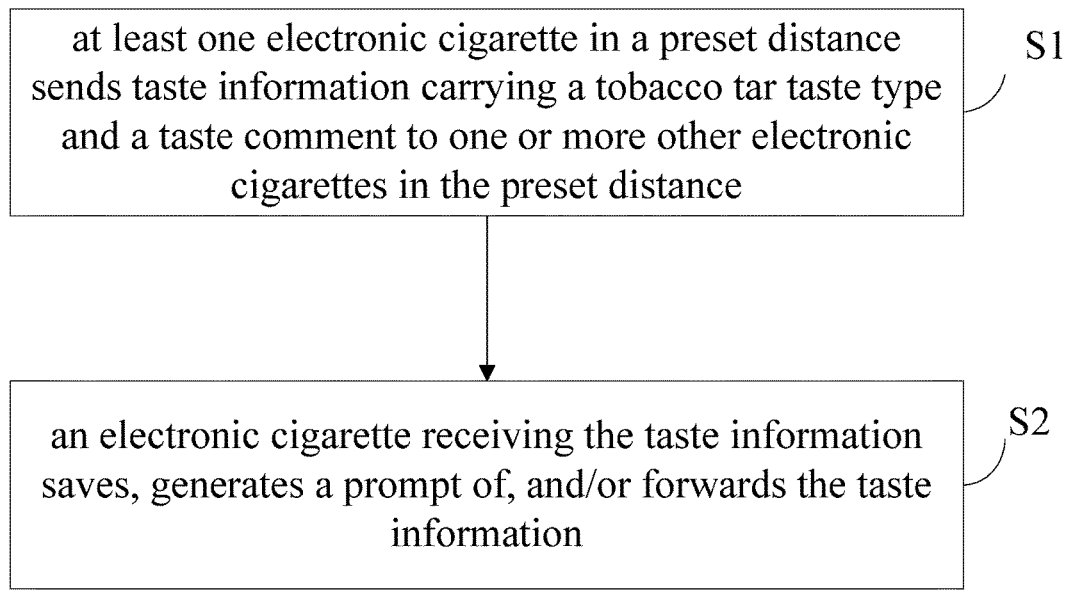
FIG. 1 is a flow chart about an information interaction method of the present application.

FIG. 1 is a flow chart about an information interaction method of the present application.

An information interaction method of the present application applied for electronic cigarettes is used for at least two electronic cigarettes for information interaction.

The method comprises following steps:

S1, at least one electronic cigarette in a preset distance sends taste information carrying a tobacco tar taste type and a taste comment to one or more other electronic cigarettes in the preset distance. Wherein, the preset distance is determined by signal transmission range of the wireless communication module in the electronic cigarette.

S2, an electronic cigarette receiving the taste information saves, generates a prompt of, and/or forwards the taste information. Generating a prompt of the taste information comprises text displaying or/and voice broadcasting or/and LED displaying.

Of course the realization of the above functions is controllable. The communication link of the electronic cigarette can be closed to avoid receiving the taste comment information sent by other electronic cigarettes to be prevented from information harassment. Therefore, the method further comprises: the taste information is allowed to be sent after the electronic cigarette sending taste information is triggered to generate a second trigger signal; or/and the method further comprises: the taste information is allowed to be received after the electronic cigarette receiving the taste information is triggered to generate a third trigger signal. For example, in the step S1 a corresponding function switch is started to send the second trigger signal before the taste information is sent; or/and in the step S2 a corresponding function switch is started to send the third trigger signal before the taste information is received.

A checking information table about the tobacco tar taste type is saved in each electronic cigarette when leaving factory. As shown in table 1, a specific code is adopted to identify kinds of tobacco tar with specific names:

TABLE 1

| code | Chinese name |
| --- | --- |
| 0X01 | coffee liquid smoke |
| 0X02 | chocolate liquid smoke |
| 0X03 | strawberry liquid smoke |

When the taste information is sent between electronic cigarettes, it is the codes in table 1 those are being sent. The electronic cigarette receiving the taste information extracts the codes and queries the Chinese name of the corresponding tobacco tar taste type with reference to table 1. Similarly, the taste comment is actually transimitted in the form of codes. A checking information table about the taste comment is shown in table 2:

TABLE 2

| code | taste comment |
|------|---------------|
| 0X01 | favorite |
| 0X02 | disfavor |

The information type transmitted between the electronic cigarettes is identified by using the hexadecimal format. For example, '0X01' is used to identify the tobacco tar taste type and '0X02' is used to identify the taste comment.

For example, in the step S1 the taste information is sent as ('0X01', '0X01'; '0X02', '0X01'), the information type indicated by '0X01' of the first field is the tobacco tar taste type; '0X01' of the second field indicates the specific value of the information type indicated by the previous field, that is the tobacco tar taste type is '0X01'; then table 1 is checked, and the tobacco tar taste type is coffee liquid smoke. Similarly, '0X02' of the third field and '0X01' of the field together indicate that the taste comment is favorite. The electronic cigarette receiving the information in the step S2 can save, and/or generate a prompt of, and/or forward the taste information.

To be clear, these information tables are not the real format of the sent information and only useful information are extracted here for explanation, such as when sending information, the header code and the check code are included. The specific format of the information is not the key of the present application, and this is not to be described in detailed here. The specific information code is not limited here, for example, it also can be binary, decimal code etc. Table 1 and table 2 are used only for example. For example, the detailed describtion about a varity of tobacco tar can be added in table 1, such as manufacturer, price, production etc.

In this embodiment, by sending the taste comment without a direction, the taste is shared between the users, reference information is provided for others to choose the liquid smoke, and the user experience is enhanced. And in step S2 if the information is forwarded, the sharing range is further broaded.

Figure 2:
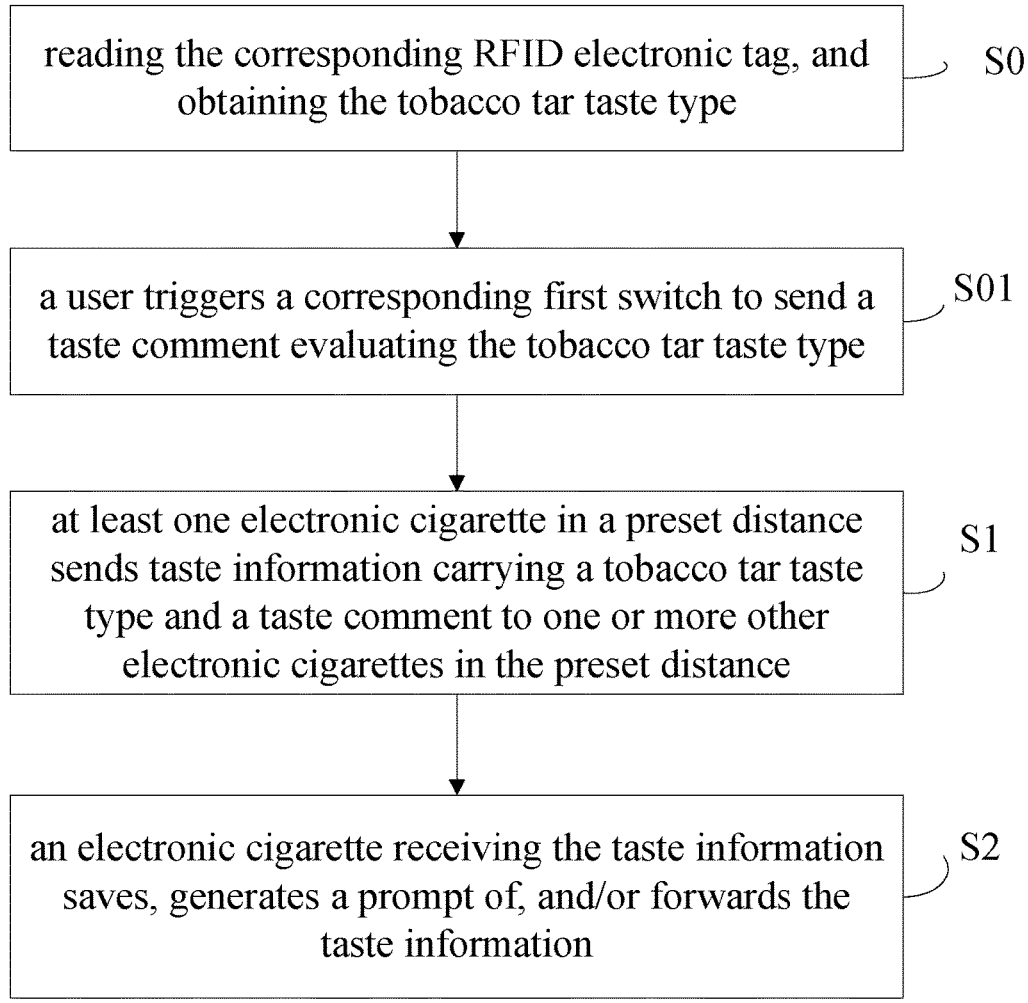
FIG. 2 is a flow chart of a first embodiment about the information interaction method of the present application.

FIG. 2 is a flow chart of a first embodiment about the information interaction method of the present application.

Each electronic cigarette comprises a battery pole and an atomizer with tobacco tar. A RFID electronic tag including the tobacco tar taste type is set on each atomizer. Therefore, when the disposable atomizer is constantly replaced, by identifying the RFID electronic tag on the atomizer, the battery pole can know the specific tobacco tar taste type of the tobacco tar in the atomizer. The electronic cigarette has at least one first switch for evaluating the tobacco tar taste type. Before the step S1 a step S0 for obtaining the tobacco tar taste type is comprised:

S0, each battery pole reads the corresponding RFID electronic tag of the atomizer, and obtains the tobacco tar taste type of the tobacco tar in the atomizer.

S01, the user triggers a corresponding first switch to evaluate the tobacco tar taste type of the tobacco tar in the atomizer.

Since the information coding format of the RFID electronic tag is different from the coding format of the tobacco tar taste type in the checking information table of the tobacco tar taste type saved inside the electronic cigarette. Therefore, when identifying it also needs to reference a corresponding checking table to find the code of the tobacco tar taste type it represents for. The checking table is similar to the above checking table, and it is not described in detail here.

The step S1 further comprises the electronic cigarette sending the taste information generates a prompt of the tobacco tar taste type of a current atomizer. Whether a prompt is generated here is chosen by the user. Therefore, the method further comprises only when the electronic cigarette sending the taste information is triggered to generate first trigger signal, it is allowed to generate a prompt of the tobacco tar taste type of the atomizer. For example, before generating a prompt of the tobacco tar taste type of the current, a corresponding function switch is started to send the first trigger signal.

It is worth noting that the sequence of steps S0 and S01 does not be limited. Just ensure that both the step S0 and the step S01 are before the step S1.

Figure 3:
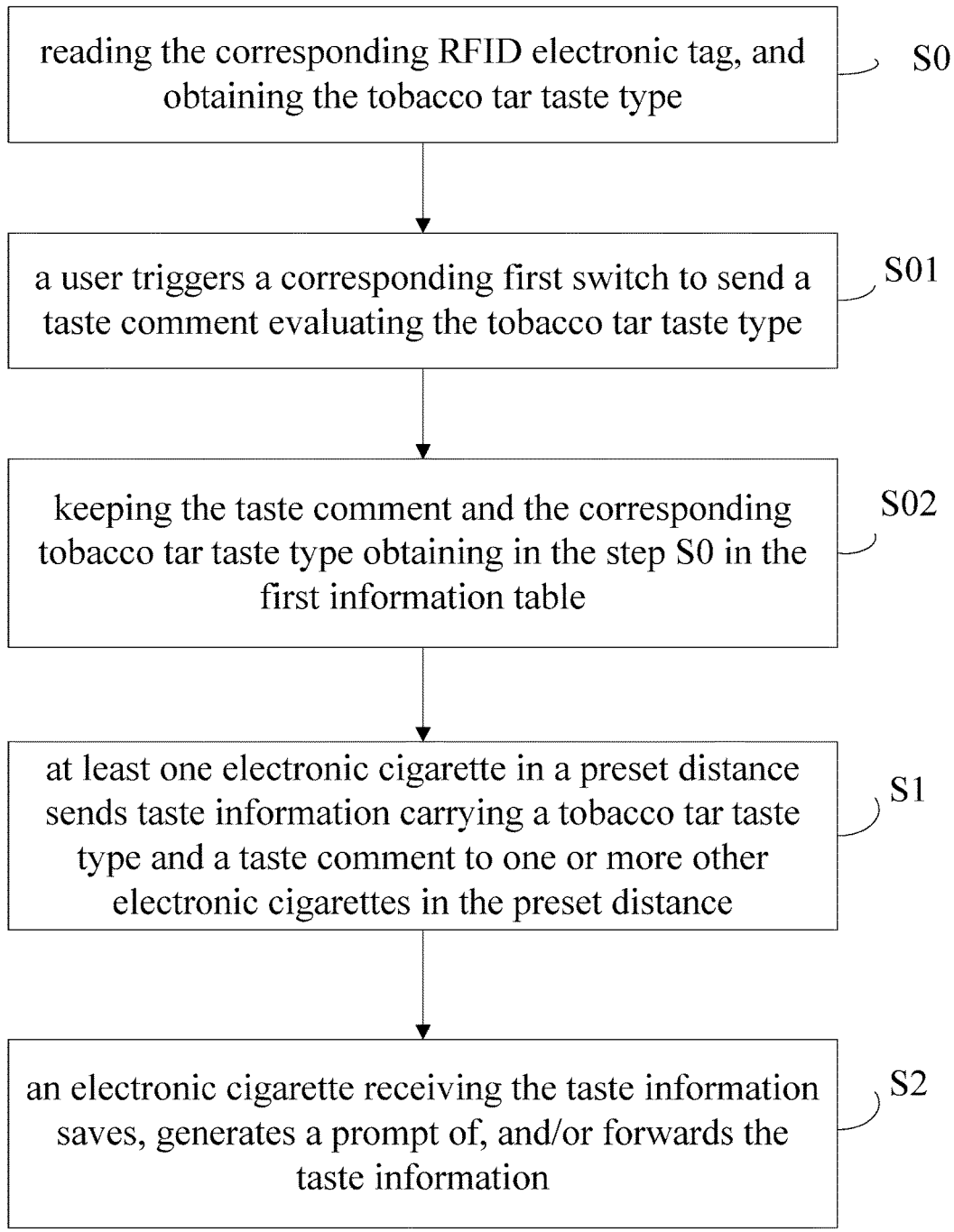
FIG. 3 is a flow chart of a second embodiment about the information interaction method of the present application.

FIG. 3 is a flow chart of a second embodiment about the information interaction method of the present application.

Because everyone's tastes are different, other people's tastes just provide a reference. Therefore, in order to facilitate the user to view their own evaluation history and to distinguish the recommend information from others, a first information table including a variety of tobacco tar taste types and comments of the user himself is saved in the control module of the electronic cigarette of the present application, which is shown as the following table 3:

TABLE 3

| tobacco tar taste type (0X01) | taste comment (0X02) |
|-------------------------------|----------------------|
| 0X09 | 0X01 |
| 0X06 | 0X01 |
| 0X03 | 0X02 |

Therefore, a step S02 is added in the second embodiment:

S02, keeping the taste comment and the corresponding tobacco tar taste type obtaining in the step S0 in the first information table. For example, when the user sucks the tobacco tar in the taste type of 0X07, he thinks the taste is good; then he can trigger the corresponding first switch representing 'favorite'; thus the electronic cigarette adds the 0X07 representing the specific type of the tobacco tar taste type and the 0X01 representing 'favorite' into the above table 3.

To avoid the same tobacco tar taste type being re-written, if the first information table has already kept the tobacco tar taste type and the taste comment obtained in this step S0, a taste comment kept before is replaced by a taste comment of this step S01 when going to the step S02. For example, if the 0X07 is already exited in the tobacco tar taste type column in the table 3, and if the user evaluates the tobacco tar taste type of 0X07 as 'disfavor' again, then first query whether the tobacco tar taste type of 0X07 has already exited in the table 3; if it is found, the 0X02 representing 'disfavor' is directly written in to cover the previous 0X01.

So, if the user wants to see his historical evaluation record, the function of querying first information table can be stared at any time. For example, it is realized by pressing some function switch. Once the user starts the function of querying first information table, the electronic cigarette generates a prompt of the tobacco tar taste type and the corresponding taste comment in the first information table to users. The way to generate a prompt can be text displaying or voice broadcasting and so on.

Further, in order to facilitate the view of other people's recommended taste information, preferably, a second information table including a variety of tobacco tar taste types and taste comments of other users is saved in the control module of the electronic cigarette, as shown in the following table 4:

TABLE 4

| tobacco tar taste type (0X01) | favorite (0X01) | disfavor (0X02) |
|---|---|---|
| 0X09 | 10 | 2 |
| 0X06 | 2 | 0 |

If the tobacco tar taste type included in the received taste information is not existed in the second information table, the received tobacco tar taste type and the received taste comment are added into second information table at the same time. The adding of the taste comment here refers to that in the specific content of the taste comment the number of the comment will be increased by one, not to write the content of the taste comment in. For example, if a taste information of ('0X01', '0X03'; '0X02', '0X01') is received, then first query if the '0X03' is exited in the tobacco tar taste type (0X01) column in the second information table, if not exited, the '0X03' is written into the tobacco tar taste type (0X01) column. According to that taste comment is '0X01', the number of the favorite (0X01) column in the second information table will be increased by one.

If the tobacco tar taste type included in the received taste information is already existed in the second information table, a taste comment received this time is added into an exited taste comment corresponding to the tobacco tar taste type. For example, if a smocking signal of ('0X01', '0X09'; '0X02', '0X01') is received, then first query if the '0X09' is exited in the tobacco tar taste type (0X01) column in the second information table, if exited, according to that taste comment is '0X01', the number of the favorite (0X01) column in the second information table will be replaced by 10+1.

If the user wants to reference the recommended information of others to buy the electronic cigarette with a high-rated tobacco tar taste, he can query the second information table. The function of querying the second information table can be started at any time, for example, it can be realized by pressing some function switch. Once the user starts the function of querying the second information table, the electronic cigarette generates a prompt of the tobacco tar taste type and the corresponding taste comment in the second information table to the user. Here, since the amount of the taste information sent by others is big, it is preferred to successively generate a prompt of the tobacco tar taste type in according to the number of 'favorite', also it can only generate a prompt of the tobacco tar taste types at the top ranking of the 'favorite' number etc.

Figure 4:
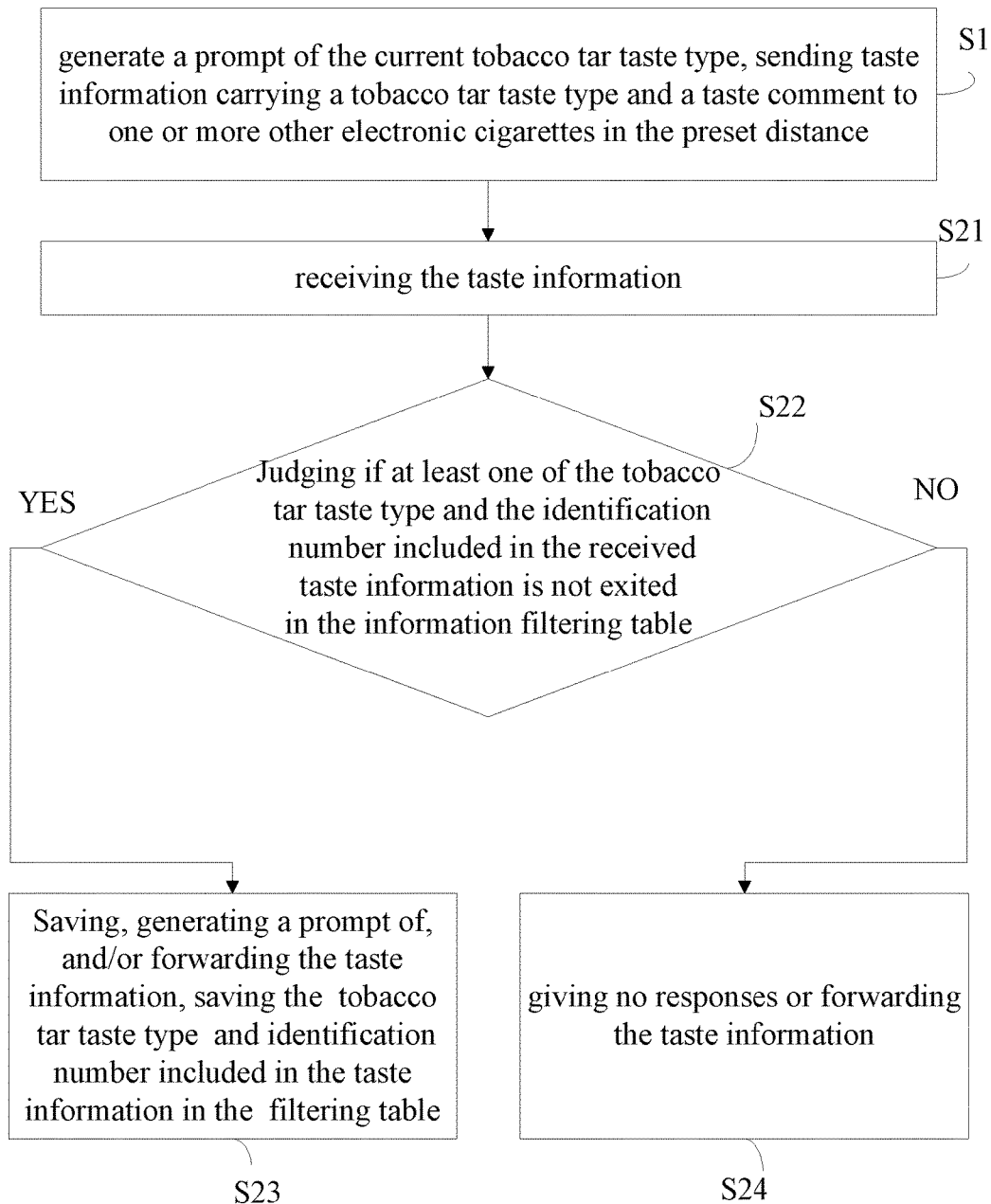
FIG. 4 is a flow chart of a third embodiment about the information interaction method of the present application.

FIG. 4 is a flow chart of a third embodiment about the information interaction method of the present application.

In the step S2, the taste information is forwarded, thus the share range is expanded and the shared information can be fast and widely spread. On the other hand, because the information is constantly being forwarded, thus after being repeatedly forwarded, the same information may be sent to the electronic cigarette that has received this signal before. Then the electronic cigarette will repeatedly receive the information, and the load of the electronic cigarette will be increased. If someone mischievously let electronic cigarettes send taste information all the time, useless information will be continuously sent to other electronic cigarettes. Therefore preferably, an information filtering table for filtering the received taste information is automatically generated in the control module of the electronic cigarette. Each of the electronic cigarettes has a unique identification: identification number. Using this identification, the information sent by some specific electronic cigarette can be filtered.

Therefore, the taste information in the step S1 further comprises an identification number of the electronic cigarette sending tobacco tar taste information.

The delivery of the identification number is similar to the above delivery of the tobacco tar taste type. In the delivery of the taste information, '0X00' indicates an identification number. For example, ('0X00', '0XAAAAAAAA'; '0X01', '0X03'; '0X02', '0X01') indicates the information is from the electronic cigarette with an identification number '0XAAAAAAAA' and the favorite taste ('0X01') is the chocolate liquid smoke ('0X02').

The information filtering table comprises a variety of tobacco tar taste types received from other electronic cigarettes, identification numbers of electronic cigarettes those have sent taste comments about the received tobacco tar taste types, each of the identification numbers is corresponding to each of the tobacco tar taste types; as shown in the following table 5:

TABLE 5

| tobacco tar taste type (0X01) | identification number |
|---|---|
| 0X03 | 0XAAAAAAAA, 0XAAAABBBB, 0XBBBBBBBB, |
| 0X07 | 0XBBBBBBBB |

In this embodiment, the step S2 specifically comprises:

S21, receiving the taste information;

S22, judging if at least one of the tobacco tar taste type and the identification number included in the received taste information is not exited in the information filtering table, if so, going to step S23; if not so, going to step S24;

S23, saving, generating a prompt of, and/or forwarding the taste information;

S24, giving no responses or forwarding the taste information.

Considering the tobacco tar taste types are limited and the number of the electronic cigarette user is large, therefore, in step S22 it is preferred to firstly query if the tobacco tar taste type included in the taste information received this time is exited, and if exited, then continue to query if the identification number inclued in the taste information received this time is exited in the corresponding identification numbers of the tobacco tar taste type.

For example, if the filtering table is shown as the above table 5, and if the taste information received by the electronic cigarette is ('0X00', '0XAAAAAAAA'; '0X01', '0X03'; '0X02', '0X01'), then first query '0X03' in the information filtering table and find it is already exited in the information filtering table; then query if the identification number inlclued in the taste information received this time is exited in the corresponding identification numbers, and find that '0XAAAAAAAA' is already exited in the information filtering table; therefore this information is judged to be a repeated information, and it is not needed to be reminded again or be kept, just go to the step S24.

Preferably, in the information interaction method of the present application, the query that whether there are similar types of electronic cigarette lovers can be realized. Specific steps are as follows:

S1', at least one electronic cigarette in a preset distance sends request information carrying an electronic cigarette type to one or more other electronic cigarettes in the preset distance;

It should be noticed that there is no direct correlation between the delivery of the request information here and the above taste information. The user can start the corresponding function at any time to send the request information.

S2', an electronic cigarette receiving the request information judges if the electronic cigarette type included in the request information is the same as an electronic cigarette type of the electronic cigarette receiving the request information, if so, sends a confirm information to the electronic cigarette sending the request information;

S3', the electronic cigarette sending the request information generates a prompt after obtaining the confirm information sent by at least one electronic cigarette.

Besides, the request information is not limited to the above request that if the electronic cigarette types are the same. It can be obtaining personal interest information of other electronic cigarette users, or the battery capacity of the electronic cigarette, the charger model for the electronic cigarette, the manufacturer information of the electronic cigarette, the manufacturing country of the electronic cigarette etc. of other electronic cigarettes. The specific format of information coding is not the focus of the invention, therefore the specific format of information coding is not described in detail here.

Figure 5:
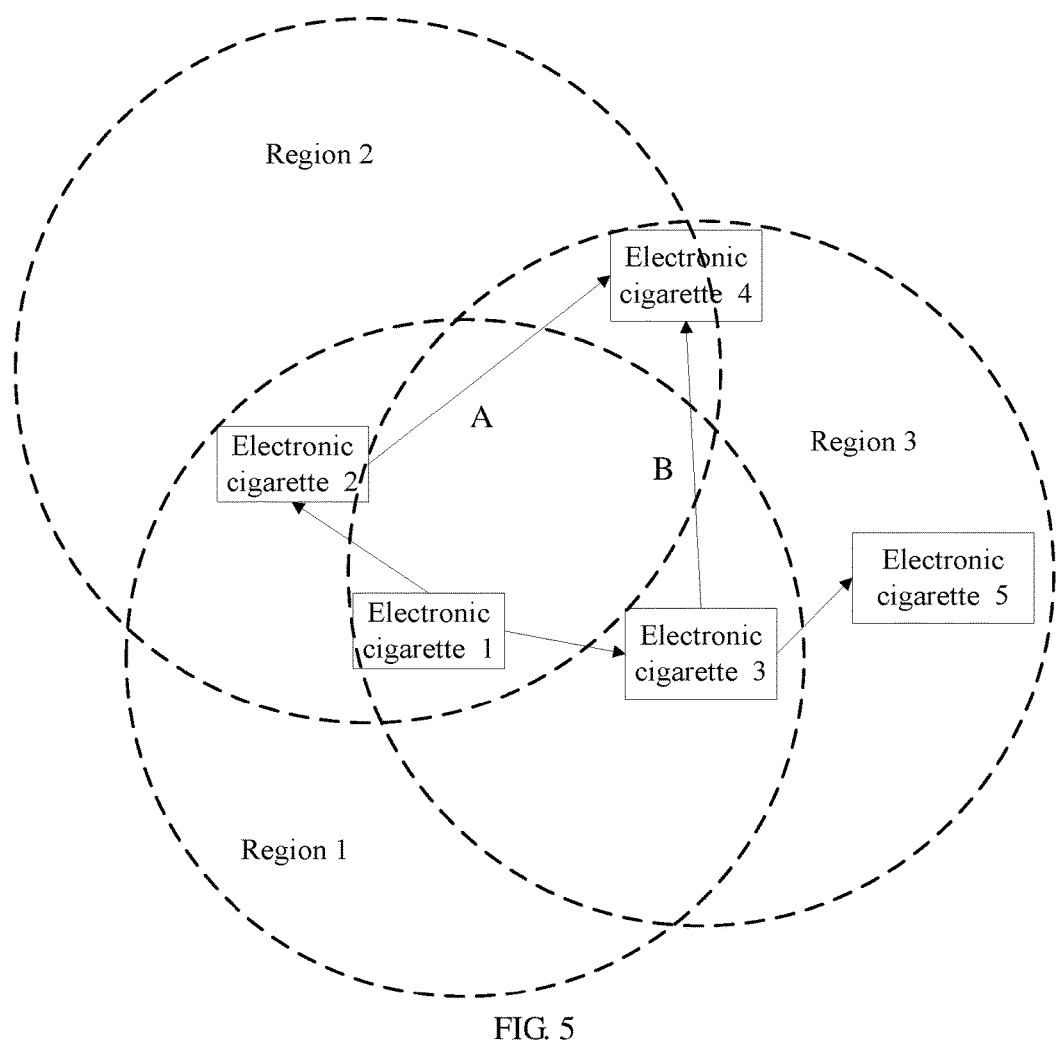
FIG. 5 is a schematic diagram about an information interaction system of the present application.

FIG. 5 is a schematic diagram about an information interaction system of the present application.

An information interaction system of the present application comprises at least two electronic cigarettes for information interaction in a preset distance. The preset distance is the wireless communication distance of the electronic cigarette.

For example, the effective communication range of the electronic cigarette 1 is a circular region 1 with the electronic cigarette 1 as the center. An electronic cigarette 2 and an electronic cigarette 3 are exited in the region 1, and the electronic cigarette 1 can share the taste information of it to the electronic cigarette 2 and the electronic cigarette 3.

If the electronic cigarette 2 and the electronic cigarette 3 forward the received taste information, the electronic cigarette 2 will forward the information in a circular region 2 with the electronic cigarette 2 as the center, and the electronic cigarette 3 will forward the information in a circular region 3 with the electronic cigarette 3 as the center. Then the electronic cigarette 4 and the electronic cigarette 5 will receive the taste information. And so on, the sharing range of the taste information can be infinitely expanded.

But it can be seen that the electronic cigarette 4 belongs to both the region 2 and the region 3, therefore the taste information from the electronic cigarette 1 will be sent to the electronic cigarette 4 respectively through the electronic cigarette 2 and the electronic cigarette 3, that is through the paths A and B in the figure. In order to avoid the repeated reaction of electronic cigarette 4 to the taste information, an information filtering table is saved in the electronic cigarette. The detail can be seen from the above described method and will not be described here.

Figure 6:
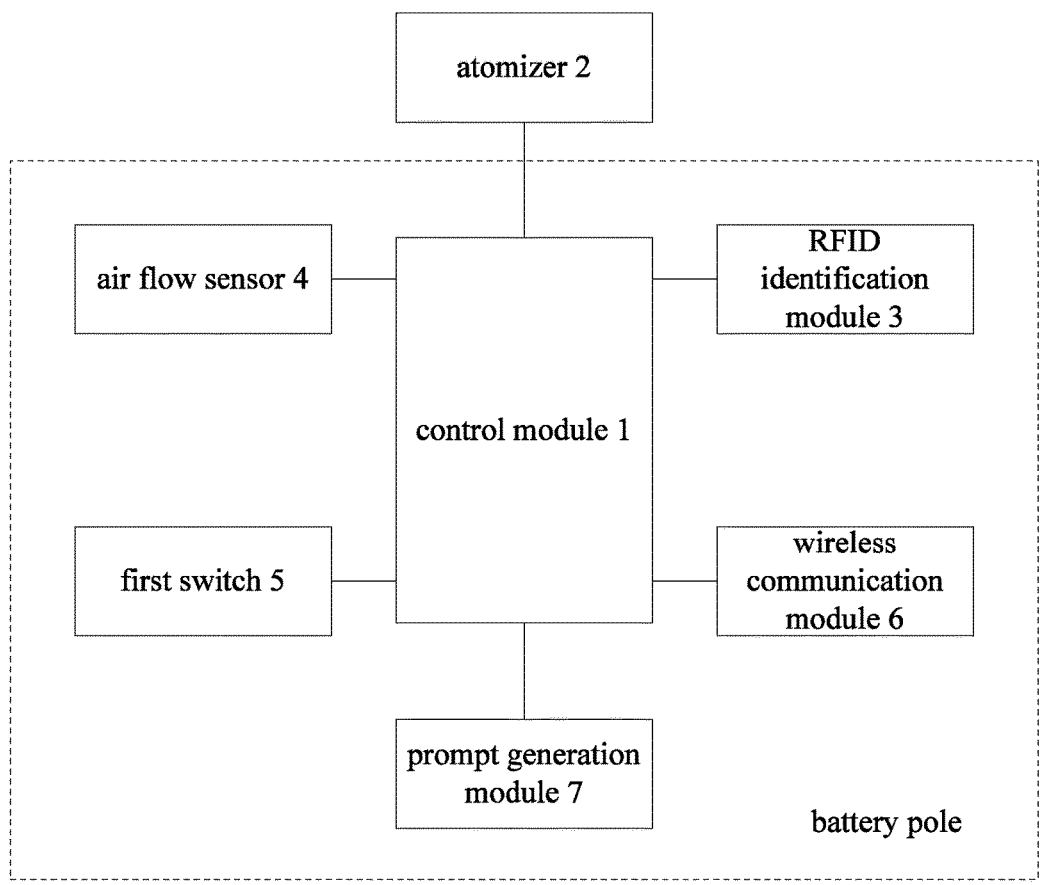
FIG. 6 is a schematic diagram of a preferred embodiment about an information interaction system of the present application.

FIG. 6 is a schematic diagram of a preferred embodiment about an information interaction system of the present application.

In a preferred embodiment, the electronic cigarette comprises an atomizer 2 and a battery pole. A RFID electronic tag for identifying the tobacco tar taste type is set on the atomizer 2. In the continuous replacement of disposable atomizer, the battery pole can know the specific tobacco tar taste type of the tobacco tar inside the atomizer by identifying the RFID electronic tag on the atomizer. The battery pole comprises a control module 1, a RFID identification module 3, an air flow sensor 4, a first switch 5, a wireless communication module 6, and a prompt generation module 7.

The atomizer 2, the RFID identification module 3, the air flow sensor 4, the first switch 5, the wireless communication module 6, and the prompt generation module 7 are respectively connected to the control module 1.

The air flow sensor 4 is configured to send airflow induction signal when sensing an air flow.

The control module 1 is further configured to control the atomizer 2 to work and atomize tobacco tar when receiving the airflow induction signal.

The RFID identification module 3 is configured to identify the RFID electronic tag of the atomizer 2 and send identifying information to the control module 1.

When triggered by a user the first switch 5 is configured to send information representing a taste comment inputted by the user to the control module 1.

The control module 1 is further configured to obtain a tobacco tar taste type of the atomizer 2 according to the identifying information, and after receiving taste comment information, load the taste information including the tobacco tar taste type and the taste comment onto the wireless communication module 6.

The wireless communication module 6 is configured to send an electromagnetic signal including the taste information to one or more other electronic cigarettes in the preset distance; or to receive an electromagnetic signal which includes a taste information and is sent by one or more other electronic cigarettes in the preset distance, and send the taste information to the control module 1.

When receiving the taste information, the control module 1 is further configured to save the taste information, or/and to reload the taste information onto the wireless communication module 6 for forwarding, or/and to send the taste information to the prompt generation module 7 to generate a prompt.

The control module 1 is further configured to send the tobacco tar taste type to the prompt generation module 7 to generate a prompt of the tobacco tar taste type of the current atomizer 2 after receiving the taste comment information.

The electronic cigarette further comprises a function switch connected to the control module 1 and configured to start a prompt generation function of the tobacco tar taste type of the current atomizer 2.

Preferably, a first information table including a variety of tobacco tar taste types and comments of the user is saved in the control module 1.

The control module 1 is further configured to keep the taste comment in the first information table after receiving the taste comment information, and the taste comment is kept according to the tobacco tar taste type obtained by the RFID identification module 3; the control module 1 is further configured to send the tobacco tar taste type and the corresponding taste comment in the first information table to the prompt generation module 7 to generate a prompt when the user starts to query historical comment information.

Further, preferably, a second information table including a variety of tobacco tar taste types and taste comments of other users is saved in the control module 1.

The control module 1 is further configured to add the received tobacco tar taste type and the received taste comment into second information table at the same time when the tobacco tar taste type included in the received taste information is not existed in the second information table; add a taste comment received this time into an exited taste comment corresponding to the tobacco tar taste type when the tobacco tar taste type included in the received taste information is already existed in the second information table; the control module 1 is further configured to when the user starts to query recommended information from others, send the tobacco tar taste types and the corresponding taste comments in the second information table to the prompt generation module 7 to generate a prompt.

Further, preferably, the control module 1 is further configured to load a request information carrying an electronic cigarette type onto the wireless communication module 6 to send it; the wireless communication module 6 is further configured to receive request information sent by one or more other electronic cigarettes in the preset distance, and to send the request information to the control module 1.

The control module 1 is further configured to when receiving the request information sent by other electronic cigarettes send, judge if the electronic cigarette type included in the request information is the same as an electronic cigarette type of the electronic cigarette receiving the request information, and if so, send a confirm information to the electronic cigarette sending the request information; the control module 1 is further configured to control the prompt generation module 7 to generate a prompt after obtaining the confirm information sent by at least one electronic cigarette.

Regarding the first information table and the second information table, the details, they are described with reference to the methods described above and will not be described in detail here again.

Figure 7:
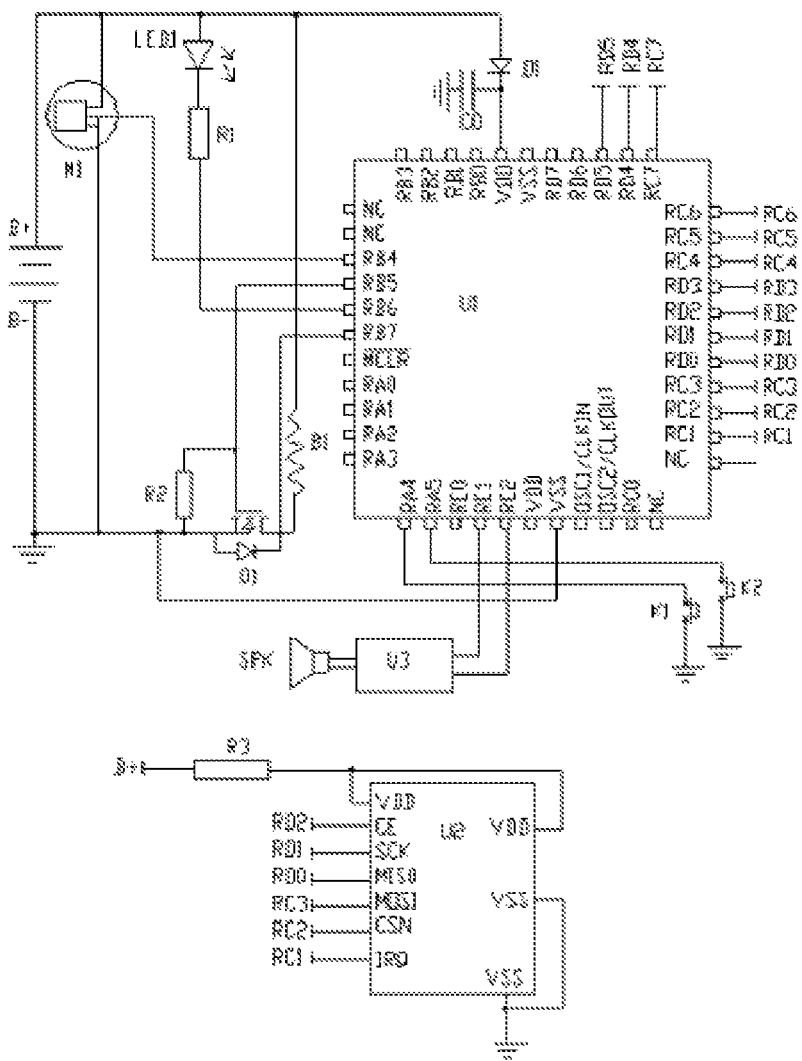
FIG. 7 is a circuit diagram of the control module and the wireless communication module of the electronic cigarette in a preferred embodiment about an information interaction system of the present application.

FIG. 7 is a circuit diagram of the control module and the wireless communication module of the electronic cigarette in a preferred embodiment about an information interaction system of the present application.

The control module 1 comprises microprocessor U1 with a type of PIC16F877, a battery, and an N-type MOS Q1. The wireless communication module 6 comprises wireless transceiver chip U2 with a type of nRF24L01. The prompt generation module 7 comprises a voice microcontroller U3 with a type of HT86A72 and a speaker SPK. The atomizer 2 comprises an electric heating wire B1. In the figure, M1 represents the air flow sensor.

The first switch 5 comprises two key switches K1 and K2, the key switches K1 and K2 respectively indicate 'favorite taste' and 'disfavor taste'. The RA4 and RA5 pins of the microprocessor U1 are respectively connected to the ground through the key switches K1 and K2, and the data input pin is connected to the cathode of the battery not shown through a pull up resistor. Therefore, in the normal condition the level detected at this pin is high; if the user likes this taste, the key switch K1 is pressed to turn it on, the RA4 pin is connected to the ground, a low level is detected; then the microprocessor U1 judges that the user inputs a taste comment of 'favorite'. It needs to be cleared that the first switch 5 is not limited here, and it also can be a touch switch, a spring switch and so on.

The source of the MOS Q1 is connected to the anode of the battery. The drain of the MOS Q1 is connected to the cathode of the battery through the electric heating wire B1. The grid of the MOS Q1 is connected to the RB5 pin of the microprocessor U1. The grid of the MOS Q1 is connected to the source of the MOS Q1 through a resistance R2. The output of the air flow sensor M1 is connected to the RB4 pin of the microprocessor U1. The cathode and the anode of the air flow sensor M1 are respectively connected to the cathode and the anode of the battery. The VDD pin of the microprocessor U1 is connected to the ground through the capacitance C0. The VDD pin is also connected to the anode of the diode D1. The cathode of the diode D1 is also connected to the cathode of the battery. The cathode of the LED light LED1 is connected to the cathode of the battery. The anode of the LED light LED1 is connected to the RB6 pin of the microprocessor U1 through the resistance R1. The VSS pin of the microprocessor U1 is connected to the ground.

The VDD pin of the wireless transceiver chip U2 is connected to the cathode of the battery through the resistance R3. The VSS pin is connected to the anode of the battery. The CE, SCK, MISO, MOSI, CSN, IRQ pin of the wireless transceiver chip U2 are respectively connected to the RD2, RD1, RD0, RC3, RC2, RC1 pin of the microprocessor U1. Only the connection between the wireless transceiver chip U2 and the microprocessor U1 is shown in the figure, and the ANT1 and the ANT2 of the wireless transceiver chip U2 connected to the inductance are not shown. Wherein, the RD2 pin of the microprocessor U1 is used to control the work of the wireless transceiver chip U2 that is to realize the control of the wireless transceiver function. If the microprocessor U1 receives the second trigger signal or the third trigger signal sent by the user triggering the corresponding function switch, the work of the wireless transceiver chip U2 can be controlled by the RD2 pin.

The voice microcontroller U3 is connected to the microprocessor U1. The SP+ pin and the SP− pin of the voice microcontroller U3 are respectively connected to the cathode and anode of the speaker SPK. Wherein the voice code can be saved inside the voice microcontroller U3, or be saved inside the microprocessor U1. According to the different voice code storage, the connection between the micro controller U2 and the microprocessor U1 is different. The connection between the voice microcontroller U3 and the microprocessor U1 in the figure is just for example. The voice code is saved in the voice microcontroller U3, and the microprocessor U1 only needs to send a signal to inform the voice microcontroller U3 to select the corresponding voice.

Figure 8:
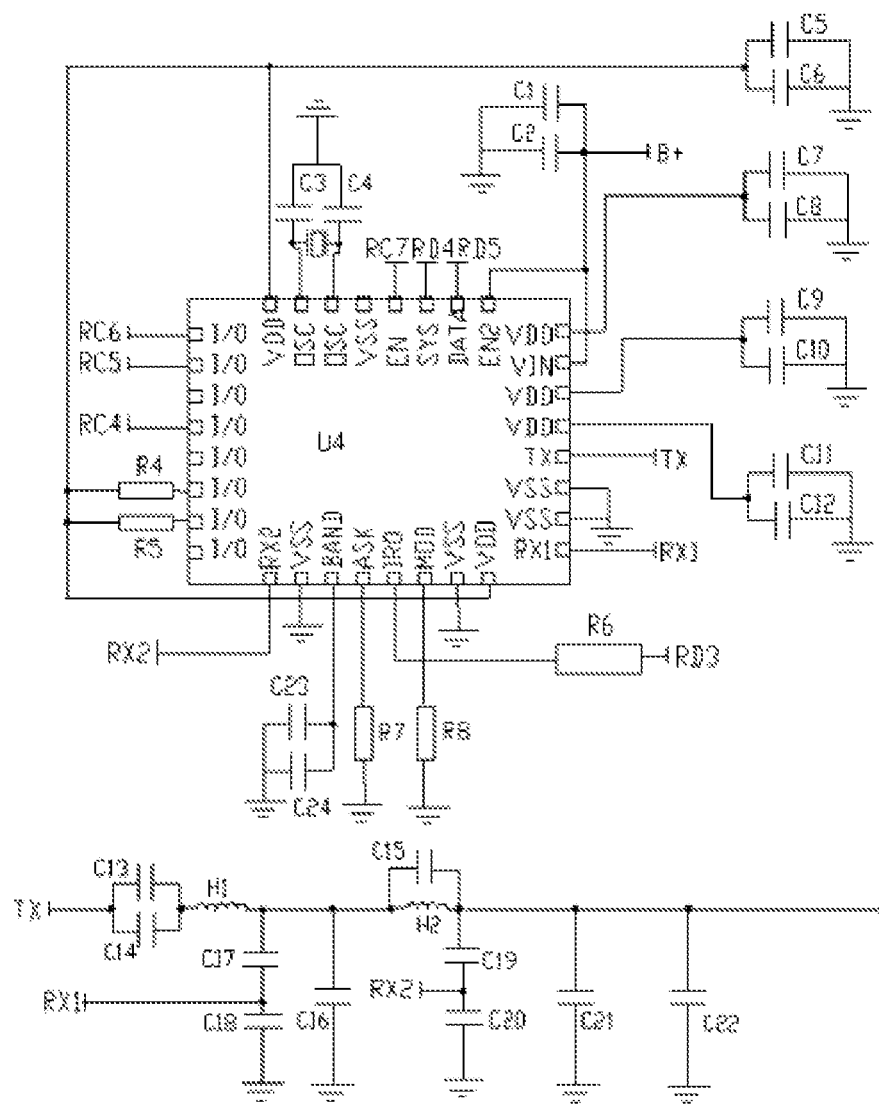
FIG. 8 is a circuit diagram of the RFID identification module of the electronic cigarette in a preferred embodiment about an information interaction system of the present application.

FIG. 8 is a circuit diagram of the RFID identification module of the electronic cigarette in a preferred embodiment about an information interaction system of the present application. The RFID identification module 3 comprises a RF chip U4 with a type of TRF796x.

The EN2 pin and the VIN pin of the RF chip U4 are coupled in parallel and connected to the cathode of the battery. The EN, SYS, DATA pin of the RF chip U4 are respectively connected to the RC7, RD4, RD5 pin of the microprocessor U1. The IRQ pin of the RF chip U4 is connected to the RD3 pin of the microprocessor U1 through the resistance R6. After passing through parallel branch of the capacitance C13 and C14, the TX pin of the RF chip U4 is connected to the inductance H1 and the inductance H2 in series and then is connected to the antenna. The TX pin receives the RF signal of the RFID electronic tag. The RD5 pin of the microprocessor U1 obtains data sent from the DATA pin. The RC7 pin of the microprocessor U1 controls the work of the RF chip U4.

The process of smoking is not a focus of the present invention and will not be described in detail herein. If when a user sucks some liquid smoke he likes it very much and wants to know the specific type to buy it next time, or wants to record it for later use, or wants to share this taste with other electronic cigarette users, he can trigger the key switch representing 'favorite taste'. Then an enable signal is output by the RC7 pin of the microprocessor U1 to control the RF chip U4 to read the RFID electronic tag of the atomizer to obtain the tobacco tar taste type. Then the data is sent to the RD5 pin of the microprocessor U1 through the DATA pin. After the tobacco tar taste type data is obtained by the microprocessor U1, on the one hand, the microprocessor U1 controls the voice microcontroller U3 to select a corresponding voice for coding, A/D converting etc., and through the broadcasting of the speaker SPK, the user can know the specific type of the tobacco tar of the atomizer 2; on the other hand, the microprocessor U1 packages the tobacco tar taste type and the taste comment of the user as the tobacco tar information, and loads it onto the wireless transceiver chip U2 through the RD1, RD0, RC3, RC2, RC1 pin, the wireless transceiver chip U2 transmits it in a preset distance without a direction in the form of the electromagnetic signal. Correspondingly, if the wireless transceiver chip U2 of some electronic cigarette receives the electromagnetic signal, it is sent to the microprocessor U1 to be saves or/and be prompted or/and be forwarded. The data transition and the control of the specific signal between the microprocessor U1 and the wireless transceiver chip U2, the voice microcontroller U3, the RF chip U4 are not described here in detail.

It needs to be cleared that the above communication is not limited here, and Wi-Fi, Bluetooth etc. can also be used, or using 315 MHz, 433 MHz or 900 MHz frequency for RF communication. All function switches are not limited here, and can be the touch switch, the spring switch etc. The prompt generation module 7 can also be a LCD display, a LED display etc.

In summary, the present application uses at least two electronic cigarettes in a preset distance to perform an information interaction; an electronic cigarette can not only send a taste information carrying a tobacco tar taste type and a taste comment to other electronic cigarettes, but also receive a taste information sent from other electronic cigarettes; furthermore, the received taste information can be chosen to be saved or/and prompted or/and forwarded; thus, the tobacco tar taste information is shared; the preferred taste can be recommended or a reference information about the unlike taste can be provided to others.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An information interaction system, comprising at least one first electronic cigarette and at least one second electronic cigarette for information interaction in a preset distance, wherein each first electronic cigarette comprises a control module (1), a wireless communication module (6), a prompt generation module (7);

the wireless communication module (6) and the prompt generation module (7) are respectively connected to the control module (1);

the control module (1) is configured to load a taste information of the first electronic cigarette including a tobacco tar taste type of the first electronic cigarette and a taste comment of the first electronic cigarette to the wireless communication module (6);

the wireless communication module (6) is configured to send an electromagnetic signal including the taste information of the first electronic cigarette to the second electronic cigarette in the preset distance; or to receive an electromagnetic signal which includes a taste information of the second electronic cigarette and is sent by the second electronic cigarette in the preset distance, and send the taste information of the second electronic cigarette to the control module (1);

when receiving the taste information of the second electronic cigarette sent by the second electronic cigarette in the preset distance, the control module (1) is further configured to save the taste information of the second electronic cigarette, or/and to reload the taste information of the second electronic cigarette onto the wireless communication module (6) for forwarding, or/and to send the taste information of the second electronic cigarette to the prompt generation module (7) to generate a prompt;

wherein the first electronic cigarette further comprises an atomizer (2), a RFID identification module (3), an air flow sensor (4) and a first switch (5); the atomizer (2), the RFID identification module (3), the air flow sensor (4) and the first switch (5) are respectively connected to the control module (1);

wherein a RFID electronic tag for identifying the tobacco tar taste type of the first electronic cigarette is fixed on the atomizer (2);

the air flow sensor (4) is configured to send an airflow induction signal when sensing an air flow;

the control module (1) is further configured to control the atomizer (2) to work and atomize tobacco tar when receiving the airflow induction signal;

the RFID identification module (3) is configured to identify the RFID electronic tag fixed on the atomizer (2) and send an identifying information to the control module (1);

the first switch (5) is configured to send information representing the taste comment of the first electronic cigarette inputted by an user to the control module (1), when triggered by the user;

the control module (1) is further configured to obtain the tobacco tar taste type of the first electronic cigarette according to the identifying information, and to load the taste information of the first electronic cigarette including the tobacco tar taste type of the first electronic cigarette and the taste comment of the first electronic cigarette onto the wireless communication module (6) after receiving the information representing the taste comment of the first electronic cigarette;

wherein the control module (1) comprises a microprocessor (U1) with a type of PIC16F877, the RFID identification module (3) comprises a RF chip (U4) with a type of TRF796x, the first switch (5) is a key switch, the wireless communication module (6) comprises a wireless transceiver chip (U2) with a type of nRF24L01; the prompt generation module (7) comprises a voice microcontroller (U3) with a type of HT86A72 and a speaker (SPK); the speaker (SPK) is connected to the voice microcontroller (U3), and the voice microcontroller (U3) is connected to the microprocessor (U1).

* * * * *